United States Patent
Okuda

(10) Patent No.: US 6,546,265 B1
(45) Date of Patent: Apr. 8, 2003

(54) PORTABLE WIRELESS COMMUNICATIONS DEVICE

(75) Inventor: Tatsumi Okuda, Motosu-gun (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/805,774

(22) PCT Filed: Mar. 3, 2000

(86) PCT No.: PCT/JP00/01314

§ 371 (c)(1),
(2), (4) Date: Mar. 16, 2001

(87) PCT Pub. No.: WO00/55979

PCT Pub. Date: Sep. 21, 2000

(30) Foreign Application Priority Data

Mar. 18, 1999 (JP) .......................................... 11-073361

(51) Int. Cl.⁷ ................................................ H04B 1/38
(52) U.S. Cl. ..................... 455/575; 455/90; 455/550
(58) Field of Search ........................ 455/550, 90, 575

(56) References Cited

U.S. PATENT DOCUMENTS

| | | | | |
|---|---|---|---|---|
| 5,617,474 A | * | 4/1997 | Ditzing et al. | 379/433.01 |
| 5,682,418 A | * | 10/1997 | Ide | 455/550 |
| 5,689,654 A | * | 11/1997 | Kikinis et al. | 710/303 |
| 5,933,330 A | * | 8/1999 | Beutler et al. | 361/814 |
| 6,058,293 A | * | 5/2000 | Phillips | 455/90 |
| 6,078,791 A | * | 6/2000 | Tuttle et al. | 455/90 |
| 6,101,372 A | * | 8/2000 | Kubo | 455/90 |
| 6,157,545 A | * | 12/2000 | Janninck et al. | 361/814 |

* cited by examiner

*Primary Examiner*—William Trost
*Assistant Examiner*—Sharad Rampuria
(74) *Attorney, Agent, or Firm*—Armstrong, Westerman & Hattori, LLP

(57) ABSTRACT

A portable wireless communications device including a casing having a circuit board accommodated therein for wireless communication and a cell chamber formed therein for accommodating a cell serving as a power source for the circuit board, the casing being formed with a peripheral wall defining the cell chamber and having an opening at each of an inlet side of the cell chamber and a bottom side thereof. The opening at the inlet side of the cell chamber is removably provided with a lid for closing the opening, and the opening at the bottom side of the cell chamber is fixedly provided with a sheet for closing the opening. This construction makes the device more compact and reduced in thickness.

16 Claims, 11 Drawing Sheets

12 (a)

$$\frac{y}{5} = \tan 3°$$

$$y = 0.26 \, mm$$

12 (b)

$$\frac{x}{10} = \tan 3°$$

$$x = 0.52 \, mm$$

13 (a)

13 (b)

14 (a)

14 (b)

PORTABLE WIRELESS COMMUNICATIONS DEVICE

BACKGROUND OF THE INVENTION

1. Field of the Invention

The present invention relates to portable wireless communications devices, such as portable telephones and pagers, which comprise a circuit board for wireless communication and a cell for supplying power to the circuit board, both housed in a flat casing.

2. Background of the Invention

FIG. 7 shows the construction of a conventional portable telephone in section orthogonal to the longitudinal direction thereof. A circuit board (7) is installed inside a flat casing (9) comprising a front case (91) and a rear case (92) which are made of a synthetic resin. A peripheral wall (95) and a bottom wall (96) which are molded integrally with the rear case (92) form a cell chamber for housing a cell (2) therein. A lid (93) for closing the cell chamber is removably attached to the rear case (92).

With portable telephones which need to be compacted and reduced in thickness, the electronic parts to be mounted on the circuit board and the cell have been made compact almost to the greatest possible extent, and extreme difficulties are encountered in making portable telephones more compact and thinner by compacting the components.

For example, even if it is attempted to reduce the thickness of the telephone shown in FIG. 7, the circuit board (7) having a large number of electronic parts mounted thereon and the cell (2) have been reduced in thickness to the limit as stated above, while the lid (93) and the casing (9) are also limited to about 0.7 mm in thickness in view of the problems as to the strength. The bottom wall (96) of the cell chamber is indispensable for supporting the cell (2) in the chamber and blocking water ingressing into the cell chamber to protect the circuit board (7) from the water.

The front case (91) and the rear case (92) providing the casing (9) are molded from resin with use of a pair of molds, respectively. These cases need to be designed in shape with consideration given to the draft of each mold. With the rear case (92), for example, a parting line A—A for the pair of molds is located at the position of the boundary between the cell chamber peripheral wall (95) and the cell chamber bottom wall (96), and the peripheral wall (95) needs to be shaped in section so as to incline at a specified angle θ (e.g., 3 deg) as shown in FIG. 12(b).

Assuming that the peripheral wall (95) has a height H, for example, of 10 mm, the inclination of the wall (95) therefore gives an excess of 0.52 mm to the lateral width thereof, with the result that the distance B1' from the side face of the cell (2) to the outer peripheral surface of the rear case (92) increases by the excess of 0.52 mm, thus entailing the problem of increasing the overall width of the casing (9).

An object of the present invention is to provide a novel construction for portable telephones or like portable wireless communications devices which serves to make the device more compacted and thinner than conventionally.

SUMMARY OF THE INVENTION

The present invention provides a first portable wireless communications device which comprises a casing (1) formed with a peripheral wall (5) defining a cell chamber and having an opening at each of an inlet side of the cell chamber and a bottom side thereof, the opening at the inlet side of the cell chamber being provided with a lid (13) removably attached to the casing (1) for closing the opening, the opening at the bottom side of the cell chamber being fixedly provided with a sheet for closing the opening.

The sheet is in the form of a flat plate or tray. The flat platelike sheet (33) has a contour extending outwardly of the opening of the peripheral wall (5) at the cell chamber bottom side. The traylike sheet (3) has a bottom wall (31) closing the opening of the peripheral wall (5) at the cell chamber bottom side, and a side wall (32) extending from an outer periphery of the bottom wall (31) and in intimate contact with the peripheral wall (5).

The sheet included in the telephone of the invention described is made of PET, synthetic resin or metal, and can be thinner than the conventional cell chamber bottom wall of synthetic resin which is molded integrally with the casing. Accordingly, the communications device of the invention can be reduced in thickness by an amount corresponding to the difference in thickness between the sheet and the conventional cell chamber bottom wall.

Stated specifically, the sheet has a rear surface in contact with a surface of a circuit board (7). An external force acting on the cell in the cell chamber is then received by the surface of the circuit board (7) through the sheet.

The casing (1) is molded from a resin with use of a pair of molds, and the peripheral wall (5) is molded from the resin with a parting line of the pair of molds positioned at an intermediate portion of thickness of the casing. The casing thus constructed can be smaller in lateral width than in a portable communications device which comprises a cell chamber peripheral wall (5) having the same height as that of the invention, and a casing molded from a resin, with the same draft [angle θ in FIG. 12(a)] as in the invention given and with a parting line of a pair of molds positioned at one of the ends of the casing in the direction of its thickness.

More specifically, the peripheral wall (5) comprises a first peripheral wall portion (51) at the cell chamber inlet side and a second peripheral wall portion (52) at the cell chamber bottom side, with the parting line serving as a boundary between the wall portions (51), (52), the peripheral wall portions (51), (52) defining respective spaces enlarged in a direction away from the parting line, the first peripheral wall portion (51) projecting at the position of the parting line toward a center of the cell chamber beyond the second peripheral wall portion (52) to form a stepped portion (53) between the peripheral wall portions (51), (52). With this specific construction, the cell can be loaded into the cell chamber with ease since the first peripheral wall portion (51) at the cell chamber inlet side provides a guide face for loading.

With the stepped portion (53) formed positively between the first and second peripheral wall portions (51), (52), the first peripheral wall portion (51) can be caused to project beyond the second peripheral wall portion (52) at all times at the position of the parting line despite molding errors, whereby the cell can be guided smoothly.

Further stated specifically, an outer end of the side wall (32) of the traylike sheet (3) is in engagement with the stepped portion (53) of the peripheral wall (5). This effectively obviates the likelihood that the water drops ingressing into the cell chamber will pass between the side wall (32) of the traylike sheet (3) and the chamber wall (5) to wet the circuit board (7).

The side wall (32) of the traylike sheet (3) is affixed to a surface of the second peripheral wall portion (52) of the peripheral wall (5). An external force acting on the cell in the cell chamber is then received by the traylike sheet (3). Moreover, the water drops ingressing into the cell chamber can then be more effectively prevented from passing between the side wall (32) of the traylike sheet (3) and the chamber wall (5) to wet the circuit board (7).

The present invention provides a second portable communications device which comprises a casing (1) molded from a resin with use of a pair of molds and formed with a peripheral wall (5) defining the cell chamber, the peripheral wall (5) being molded from the resin with a parting line of the pair of molds positioned at an intermediate portion of thickness of the casing, the peripheral wall (5) having an opening at each of an inlet side of the cell chamber and a bottom side thereof, the opening at the inlet side of the cell chamber being removably provided with a lid (13) for closing the opening.

The casing thus constructed can be smaller in lateral width than in a portable communications device which comprises a cell chamber peripheral wall (5) having the same height as that of the invention, and a casing molded from a resin, with the same draft [angle θ in FIG. 12(*a*)] as in the invention given and with a parting line of a pair of molds positioned at one of the ends of the casing in the direction of its thickness.

Stated specifically, the opening of the peripheral wall (5) at the bottom side of the cell chamber is fixedly provided with a sheet for closing the opening.

The sheet is in the form of a flat plate or tray. The flat platelike sheet (33) has a contour extending outwardly of the opening of the peripheral wall (5) at the cell chamber bottom side, the outward extension being in intimate contact with an end face of the peripheral wall (5). The traylike sheet (3) has a bottom wall (31) closing the opening of the peripheral wall (5) at the cell chamber bottom side, and a side wall (32) extending from an outer periphery of the bottom wall (31) and in intimate contact with the peripheral wall (5).

The sheet included in the specific construction described is made of PET, synthetic resin or metal, and can be thinner than the conventional cell chamber bottom wall of synthetic resin which is molded integrally with the casing. Accordingly, the communications device of the invention can be reduced in thickness by an amount corresponding to the difference in thickness between the sheet and the conventional cell chamber bottom wall.

More specifically, the peripheral wall (5) comprises a first peripheral wall portion (51) at the cell chamber inlet side and a second peripheral wall portion (52) at the cell chamber bottom side, with the parting line serving as a boundary between the wall portions (51), (52), the peripheral wall portions (51), (52) defining respective spaces enlarged in a direction away from the parting line, the first peripheral wall portion (51) projecting at the position of the parting line toward a center of the cell chamber beyond the second peripheral wall portion (52) to form a stepped portion (53) between the peripheral wall portions (51), (52). With this specific construction, the cell can be loaded into the cell chamber with ease since the first peripheral wall portion (51) at the cell chamber inlet side provides a guide face for loading.

With the stepped portion (53) formed positively between the first and second peripheral wall portions (51), (52), the first peripheral wall portion (51) can be caused to project beyond the second peripheral wall portion (52) at all times at the position of the parting line despite molding errors, whereby the cell can be guided smoothly.

More specifically, an outer end of the side wall (32) of the traylike sheet (3) is in engagement with the stepped portion (53) of the peripheral wall (5). This effectively obviates the likelihood that the water drops ingressing in to the cell chamber will pass between the side wall (32) of the traylike sheet (3) and the chamber wall (5) to wet the circuit board (7).

As described above, the first portable communications device of the invention can be made thinner than in the prior art, and the second portable communications device of the invention can be made smaller in lateral width than conventionally.

DETAILED DESCRIPTION OF THE PREFERRED EMBODIMENTS

Figure 1:
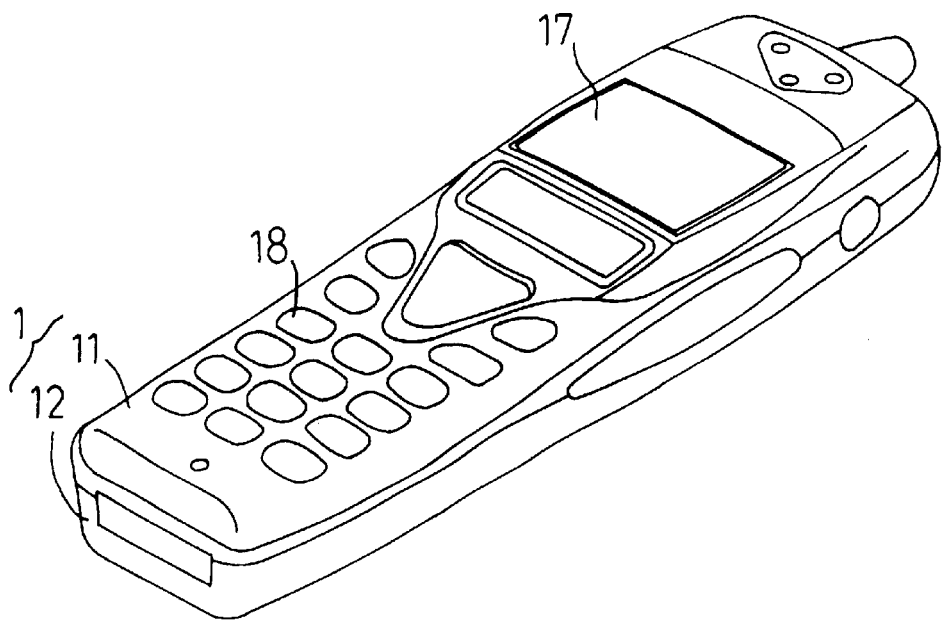
FIG. 1 is a perspective view of a portable telephone according to the invention as seen from the front thereof.
Figure 2:
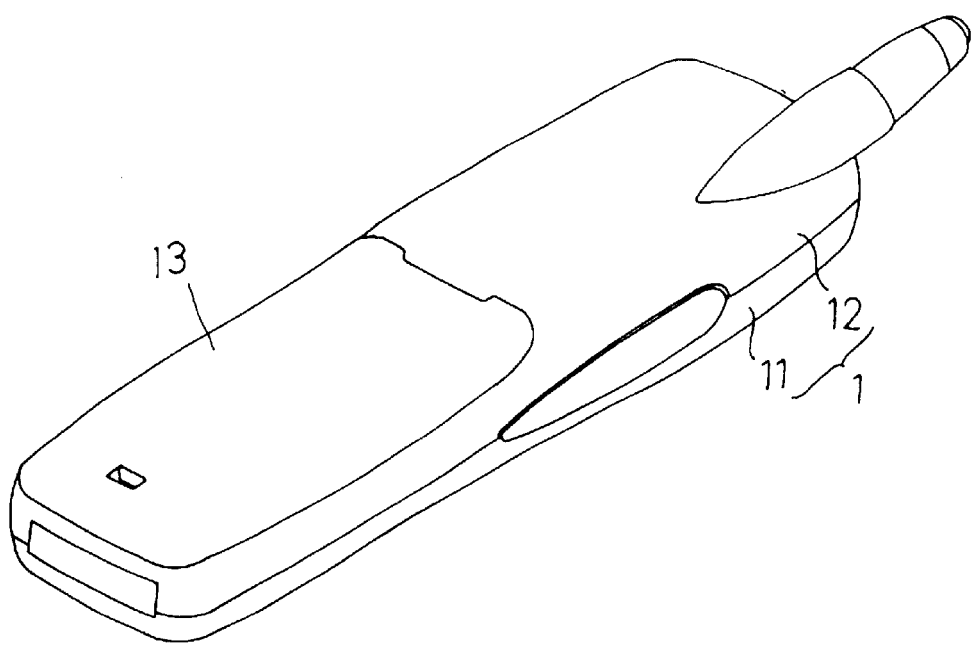
FIG. 2 is a perspective view of the telephone as it is seen from behind.

Portable telephones embodying the present invention will be described below in detail with reference to the drawings. Referring to FIG. 1, the portable telephone of the present invention has a flat casing (1) comprising the combination of a front case (11) and a rear case (12) which are molded from a synthetic resin. The front case (11) has arranged on its front surface a display (17) and manual keys (18). As seen in FIG. 2, a lid (13) which is opened for the replacement of a cell (2) is removably attached to the rear case (12).

Figure 3:
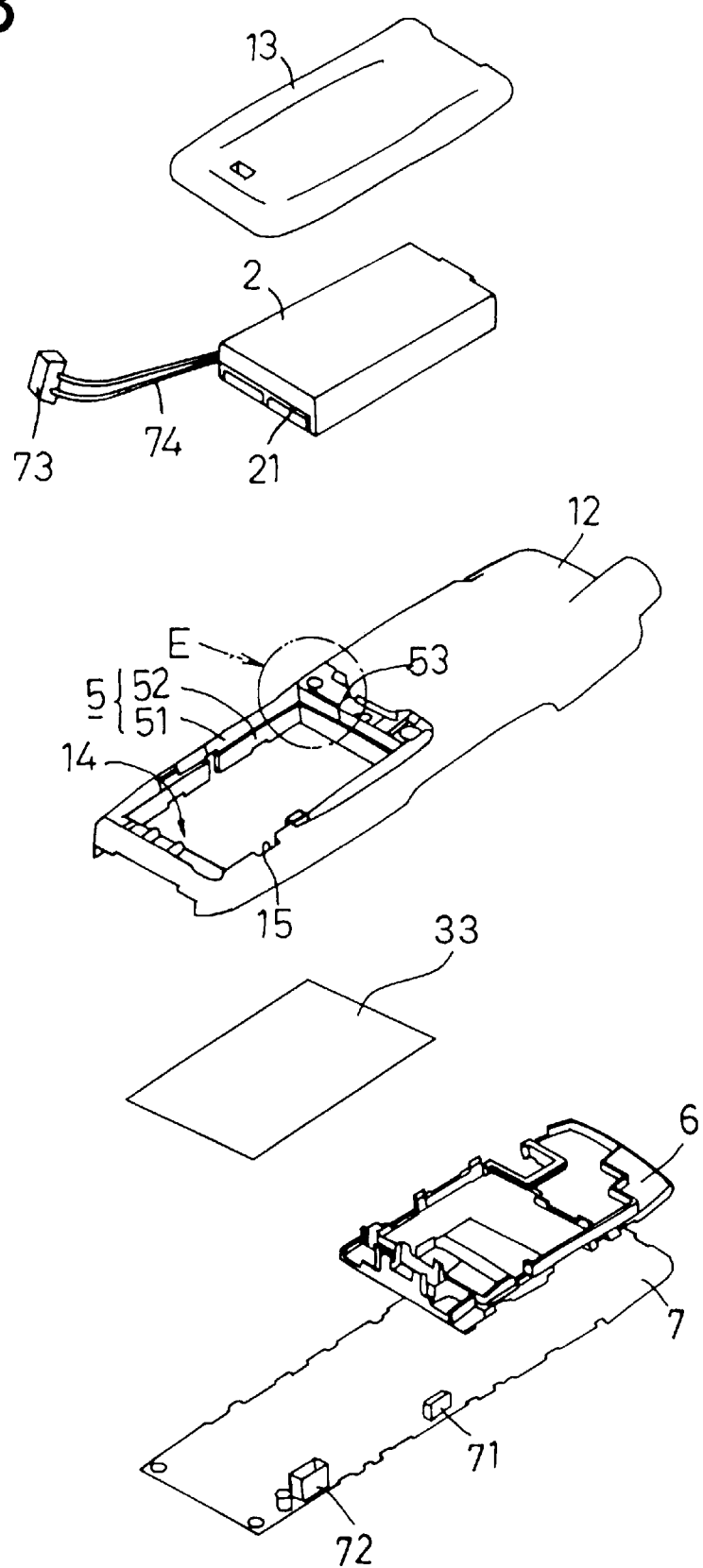
FIG. 3 is an exploded perspective view of the telephone which has a flat platelike sheet.

Arranged inside the casing (1) are a circuit board (7) having a plurality of electronic parts (71) mounted thereon and a resin chassis (6) as shown in FIG. 3. The rear case (12) has an opening (14) providing a cell chamber and defined by a peripheral wall (5), which comprises a first peripheral wall portion (51) and a second peripheral wall portion (52). The border line between these wall portions is located at an intermediate portion of the thickness of the casing.

A PET sheet (33) in the form of a flat plate is affixed to the bottom end face of the cell chamber peripheral wall (5)

of the rear case (12). The sheet (33) is generally rectangular, extends outwardly of the opening (14) of the case (12) and closes the opening (14).

Figure 4:
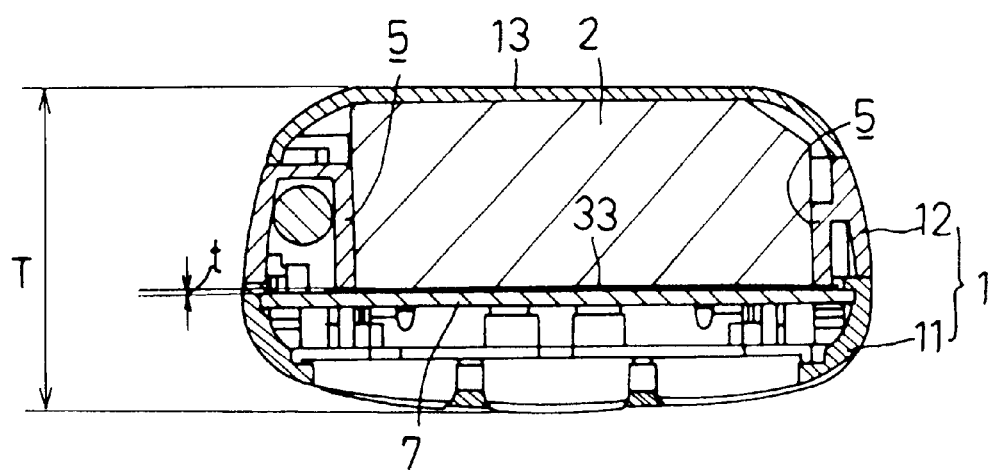
FIG. 4 is a view in section of the telephone.

FIG. 4 shows the construction of the telephone in section orthogonal to the longitudinal direction thereof. The cell chamber for placing the cell (2) therein is surrounded by the peripheral wall (5) of the rear case (12), sheet (33) and lid (13). The sheet (33) has its outer peripheral portion affixed to the end face of the case (12) as stated above to realize a waterproof structure against the ingress of water drops from the cell chamber. The sheet (33) has a rear surface in contact with a surface of the circuit board (7). An external force acting on the cell (2) is received by the circuit board (7) through the sheet (33).

Figure 7:
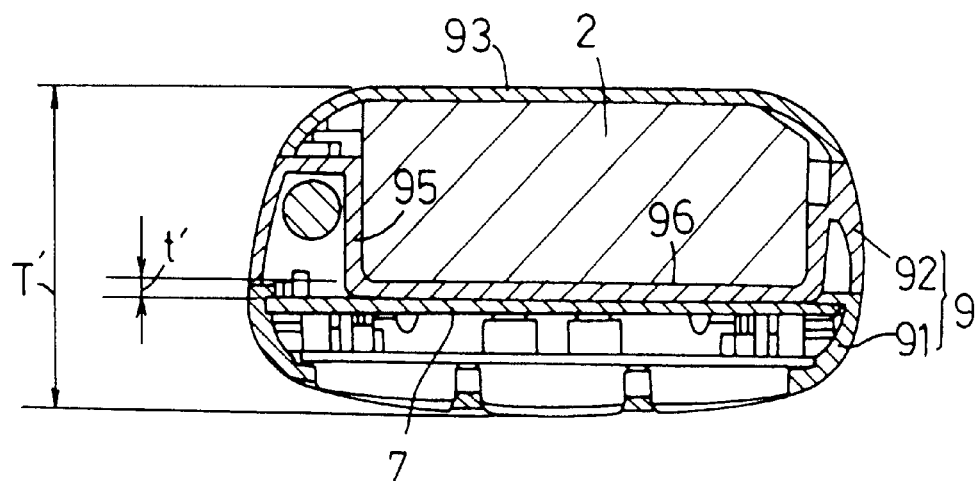
FIG. 7 is a view in section of a conventional portable telephone.

With the telephone of the present invention as shown in FIG. 4, the flat sheet (33) is a member separate from the rear case (12) and can be given a thickness t which is as small as, for example, about 0.1 mm. On the other hand, the cell chamber bottom wall (96) of the conventional casing (9) shown in FIG. 7 is molded integrally with the rear case (92) and has a thickness t' which is limited to about 0.7 at the smallest. The thickness T of the casing (1) of the telephone of the invention can therefore be made smaller than the thickness T' of the conventional casing (9) by about 0.6 mm.

Figure 5:
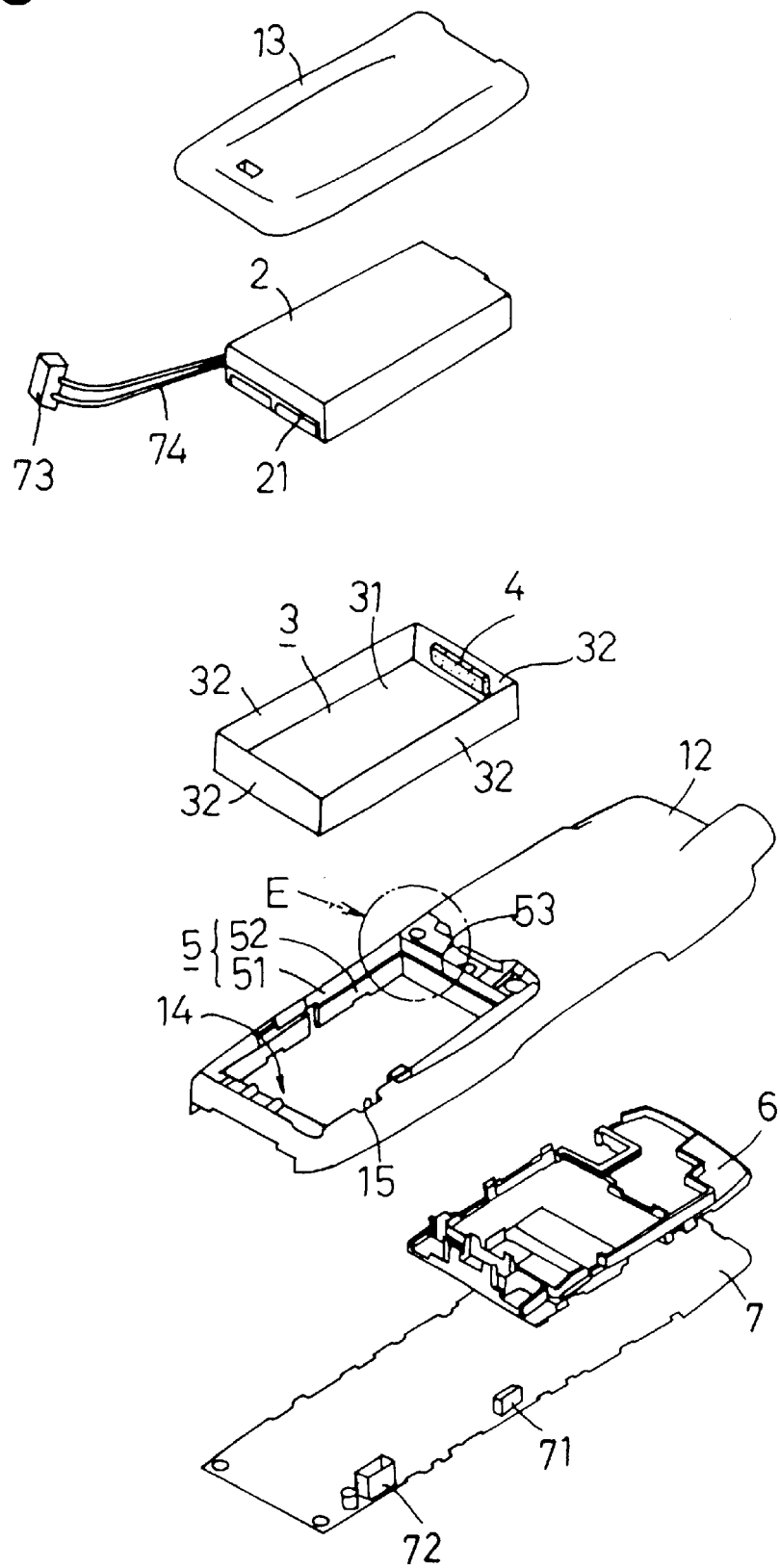
FIG. 5 is an exploded perspective view of a portable telephone having a traylike sheet.

Further with the portable telephone of the present invention, a traylike sheet (3) of PET which is adapted to place the cell (2) therein can be attached to the cell chamber peripheral wall (5) in place of the flat sheet (33) as seen in FIG. 5. The traylike sheet (3) comprises a bottom wall (31) shaped in the form of a rectangle to close the bottom opening of the cell chamber of the rear case (12), and four side walls (32) extending from the respective four sides of the bottom wall (31). These four side walls (32) are in intimate contact with the second peripheral wall portion (52) of the peripheral wall (5), and at least one side wall (32) is affixed to the second wall portion (52). A cushion member (4) is attached to the inner surface of the sheet side wall (32) positioned toward the head of the casing.

While the traylike sheet (3) can be shaped in the form of a box which is open at its upper side as illustrated, the sheet can be prepared by folding a flat sheet which corresponds to the box-shaped sheet as developed to a planar form.

The cell (2) is in the form of a flat rectangular parallelepiped. A cord (74) extending from the electrode terminals (not shown) of the cell (2) is provided at its outer end with a male connector (73). On the other hand, a female connector (72) is installed on the circuit board (7). Electric power is supplied from the cell (2) to the circuit board (7) by inserting the male connector (73) into the female connector (72).

Figure 6:
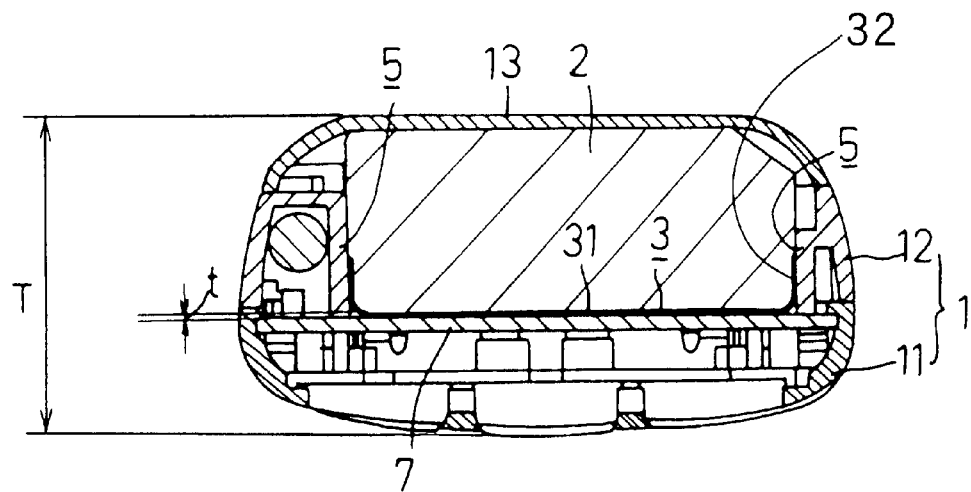
FIG. 6 is a view in section of the telephone.

FIG. 6 shows the construction of the portable telephone provided with the traylike sheet (3) in section orthogonal to the longitudinal direction thereof. The cell chamber for placing the cell (2) therein is surrounded by the peripheral wall (5) of the rear case (12), the bottom wall (31) of the traylike sheet (3) and lid (13). The sheet (3) has its side walls (32) held in intimate contact with the second peripheral wall portion (52) of the cell chamber peripheral wall (5) as stated above to realize a waterproof structure against the ingress of water drops from the cell chamber. The bottom wall (31) of the sheet (3) is in contact with a surface of the circuit board (7). An external force acting on the cell (2) is received by the circuit board (7) through the bottom wall (31) of the traylike sheet (3).

Similarly with the telephone of the invention shown in FIG. 6, the traylike sheet (3) is a member separate from the rear case (12) and can be given a thickness t which is as small as, for example, about 0.1 mm, with the result that the casing (1) can be thinner than the conventional casing (9) by about 0.6 mm.

Figure 8:
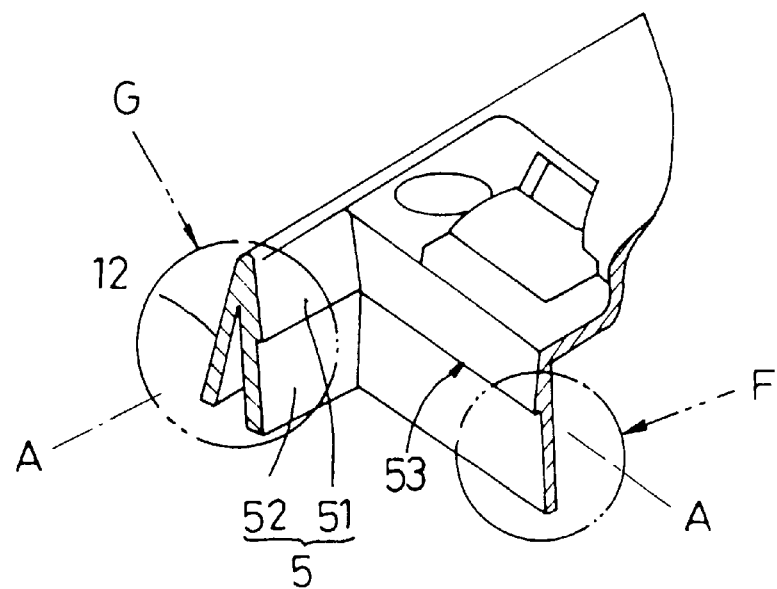
FIG. 8 is a fragmentary perspective view of the portable telephone according to the invention.

With reference to FIGS. 8 to (11), the cell chamber peripheral wall (5) of the rear case (12) of the telephone of the invention is molded from a resin with use of a pair of molds, with a parting line A—A of the molds extending across the entire periphery of the wall (5) and positioned at an intermediate portion of the thickness of the casing (1). The first peripheral wall portion (51) having a predetermined draft θ (e.g., 3 deg) is formed at the cell chamber inlet side of the parting line A—A, and the second peripheral wall portion (52) having a predetermined draft θ (e.g., 3 deg) is formed at the other side, i.e., the cell chamber bottom side, of the parting line A—A. Consequently, the spaces surrounded by the respective wall portions (51), (52) each expand in a direction away from the parting line A—A.

At the position of the parting line A—A, the first peripheral wall portion (51) projects toward the center of the cell chamber beyond the second peripheral wall portion (52), for example, by about 0.2 mm, whereby a stepped portion (53) is formed between the two wall portions (51), (52).

Figure 9:
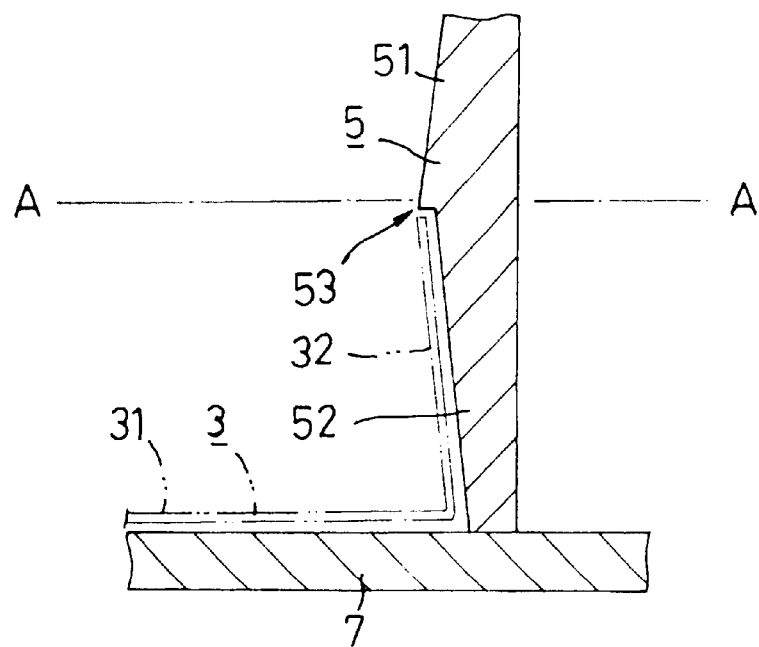
FIG. 9 is a sectional view showing the portion F of FIG. 8 on an enlarged scale.
Figure 10:
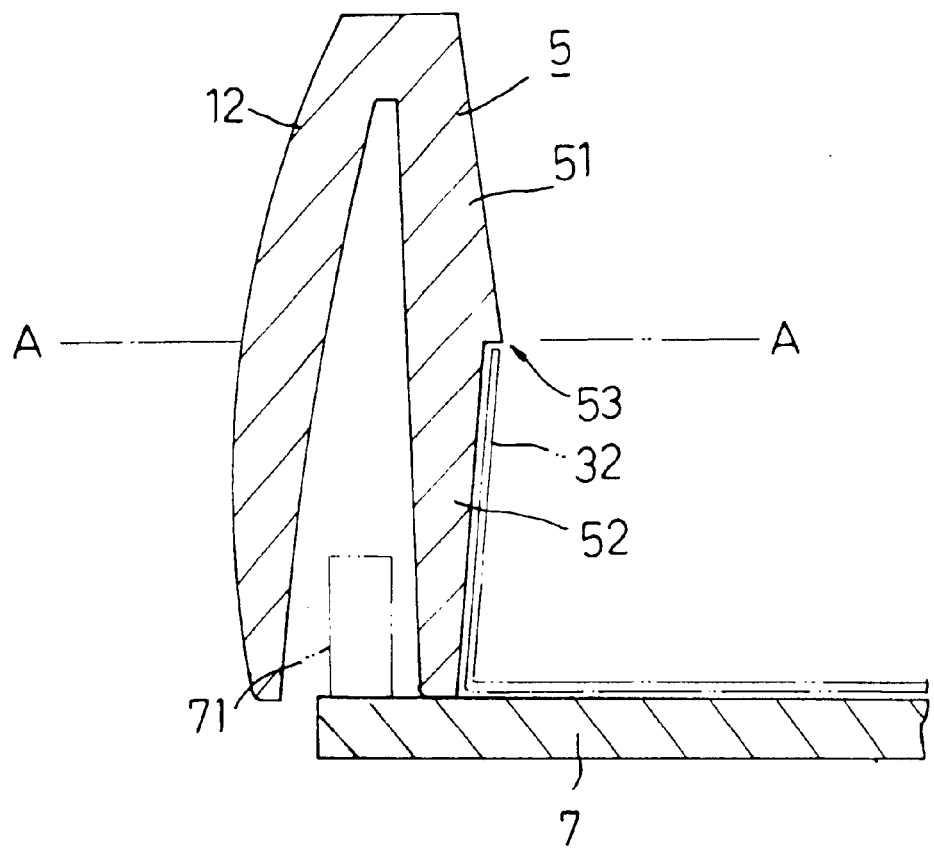
FIG. 10 is a sectional view showing the portion G of FIG. 8 on an enlarged scale.

FIG. 9 is an enlarged view of the portion F in FIG. 8, and FIG. 10 is an enlarged view of the portion G in FIG. 8. As shown in these drawings, the bottom wall (31) of the traylike sheet (3) is placed on the circuit board (7), and the side wall (32) thereof is positioned along the inner surface of the second peripheral wall portion (52) of the cell chamber wall (5) and has its upper end engaged with the stepped portion (53) of the wall (5).

Figure 11:
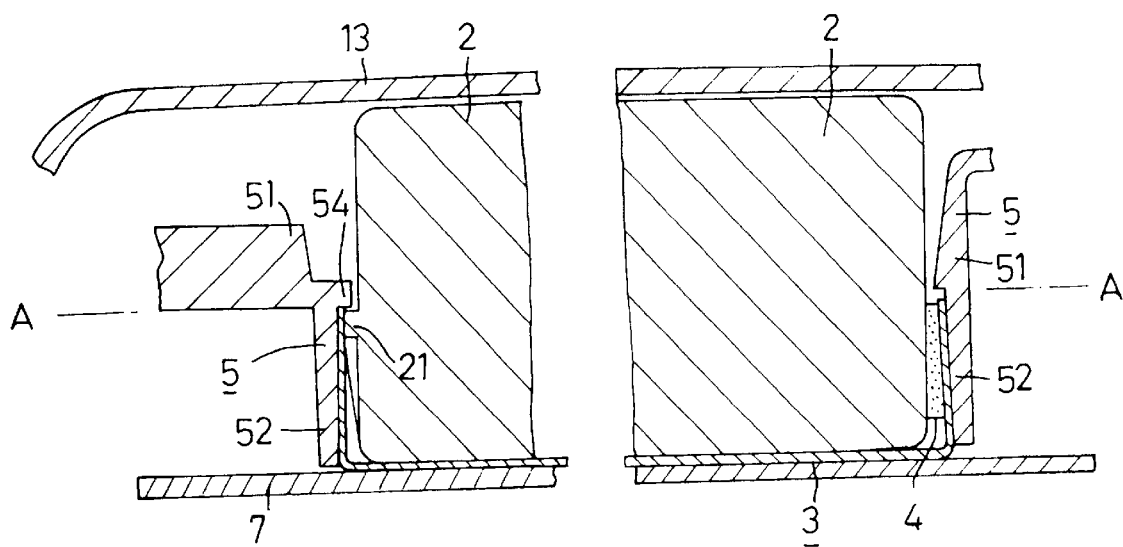
FIG. 11 is a view in section of the telephone along the longitudinal direction thereof.

FIG. 11 is a view in section along the longitudinal direction of the casing (1). The first peripheral wall portion (51) and the second peripheral wall portion (52) are formed at opposite sides of the parting line A—A also in the tail portion of the casing, providing the cell chamber wall (5). A stepped portion (54) projecting into the cell chamber is provided at the boundary between these wall portions.

On the other hand, the cell (2) is provided at the rear end face thereof with a projection (21) in engagement with the stepped portion (54) of the chamber wall (5) for preventing the cell (2) from slipping out of the chamber. Incidentally, when to be placed into the cell chamber, the cell (2) is pushed into the chamber with the front end face of the cell pressed against the cushion member (4), whereby the projection (21) of the cell (2) is moved past the stepped portion (54) of the chamber peripheral wall (5) into engagement therewith as illustrated.

Figure 12:
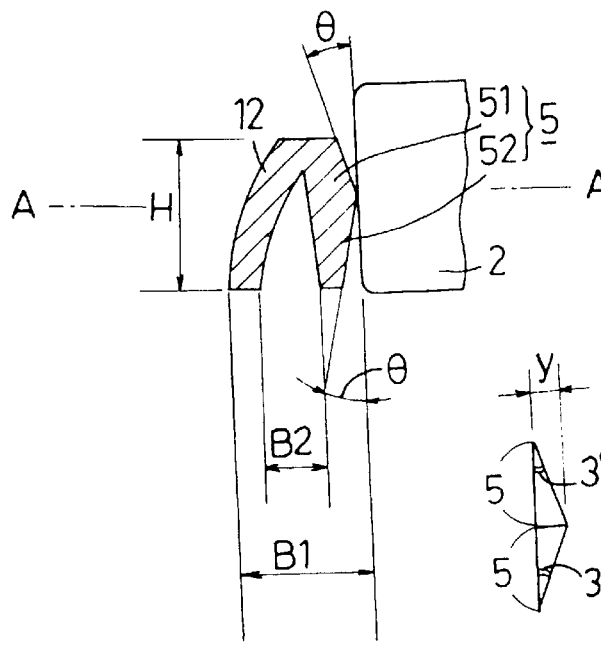
FIG. 12(*a*) and FIG. 12(*b*) are diagrams showing a rear case of the telephone of the invention and that of the conventional telephone, respectively, in section for a comparison of the shape and dimensions.
Figure 12:
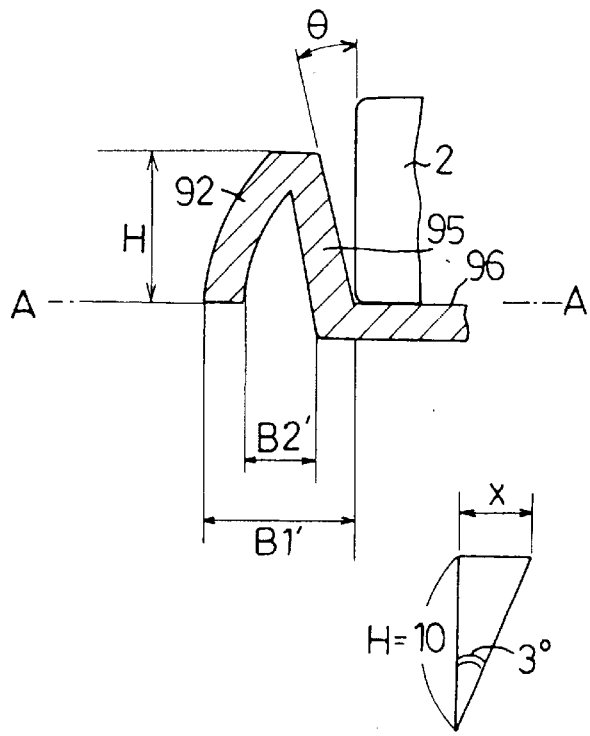

As shown in FIG. 12(a), the parting line A—A of the pair of molds is positioned at an intermediate portion of width of the rear case (12) of the casing (1) described, and the cell chamber peripheral wall (5) is so designed that the first wall portion (51) and the second wall portion (52) are each inclined at the predetermined angle θ (e.g., 3 deg).

Assuming that the cell chamber wall (5) has a height H, for example, of 10 mm, the inclination of the first and second wall portions (51), (52) produces only an excess of 0.26 mm in the lateral width of each wall portion. A comparison of the rear case (12) with the conventional rear case (92) shown in FIG. 12(b) indicates that the distance B1 from the side face of the cell (2) to the outer surface of the rear case (12) is shorter than the conventional distance B1' by 0.26 mm.

This reduces the overall width of the casing (9). If the casing (1) of the invention is given the same overall width as the conventional casing (9), a wedge-shaped space formed between the outer peripheral wall of the rear case

(12) and the chamber wall (5) has a width B2 which is greater than the width B2' of the corresponding space in the conventional casing, making it possible to accommodate an electronic part or the like in the space. FIG. 10 shows such an electronic part (71) placed in the space and mounted on the circuit board (7).

Figure 13:
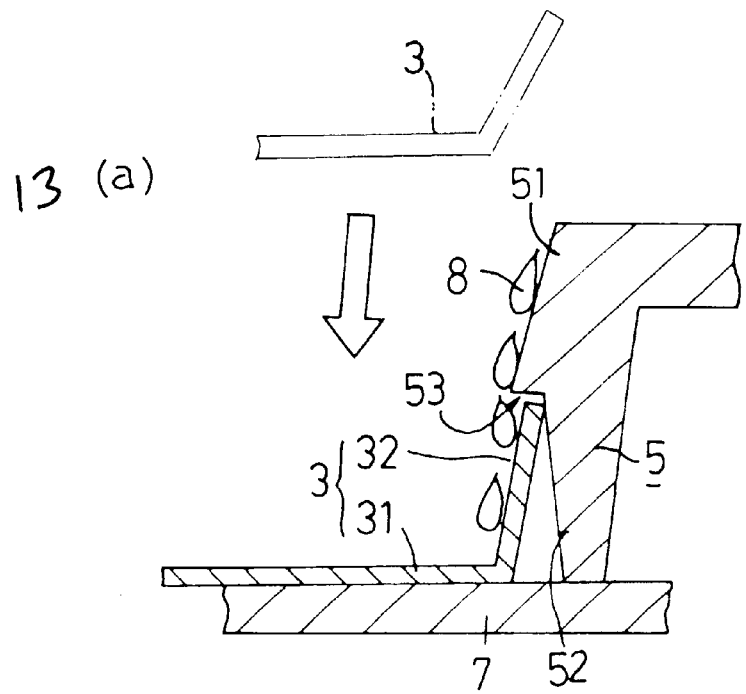
FIG. 13(*a*) and FIG. 13(*b*) are sectional views for illustrating the waterproof effect of the portable telephone of the invention.
Figure 13:
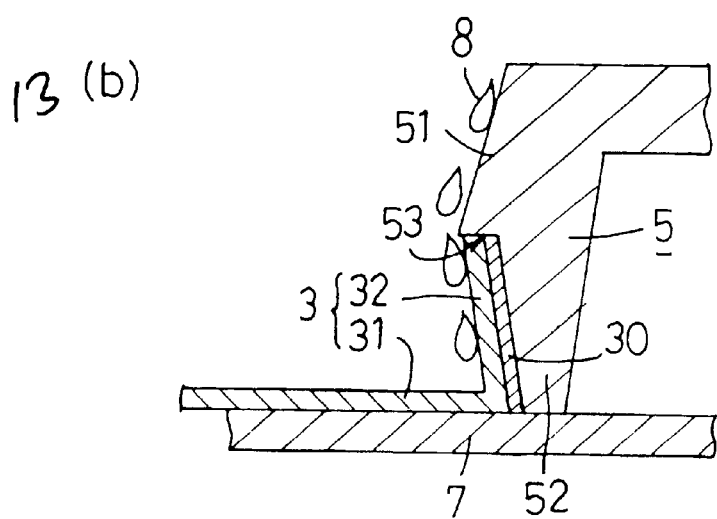

With the portable telephone described, the traylike sheet (3) so folded in section as to spread outward as it extends upward is merely pushed into the cell chamber from its inlet side and placed on the circuit board (7) as shown in FIG. 13(a), whereby the upper end of the side wall (32) of the sheet (3) is engaged with the stepped portion (53) of the cell chamber wall (5), preventing the sheet (3) from slipping out even when the side wall is not affixed to the wall (5). Furthermore, the upper end of the side wall (32) is held in pressing contact with the inner surface of the chamber wall (5) by virtue of its elastic restoring force, providing a waterproof structure, so that even if water drops (8) ingress into the cell chamber, there is no likelihood that the water drops (8) will pass between the sheet (3) and the chamber wall (5) to wet the circuit board (7).

A further improved waterproof effect is available by bonding all the side walls (32) of the traylike sheet (3) to the inner surface of the second peripheral wall portion (52) of the chamber wall (5) with an adhesive or thermally as shown in FIG. 13(b).

In either of the cases of FIG. 13(a) and FIG. 13(b), the cell (2) can be loaded into the cell chamber with ease because the first peripheral wall portion (51) provides a guide surface for loading. Since the upper end of the side wall (32) of the sheet (3) is hidden beneath the stepped portion (53), the cell to be loaded or unloaded is unlikely to cause damage to the sheet (3) or to locally remove the sheet.

Figure 14:
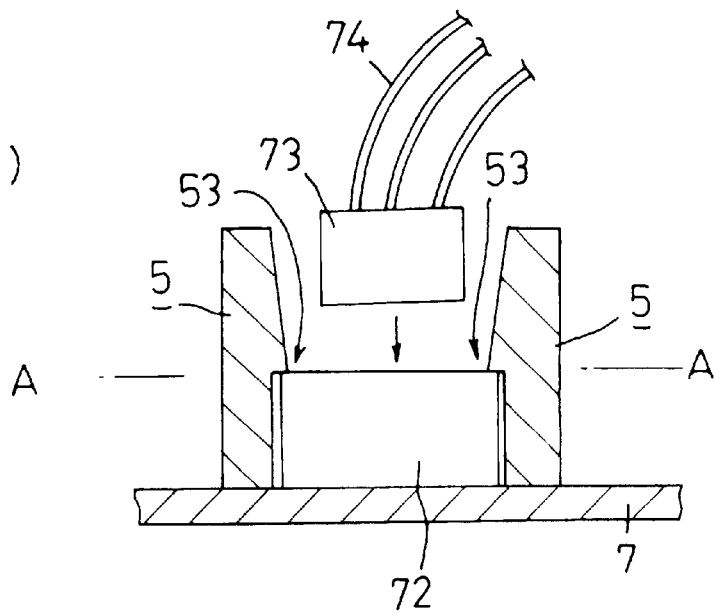
FIG. 14(*a*) and FIG. 14(*b*) are sectional views showing a connector restraining structure used in the telephone of the invention.
Figure 14:
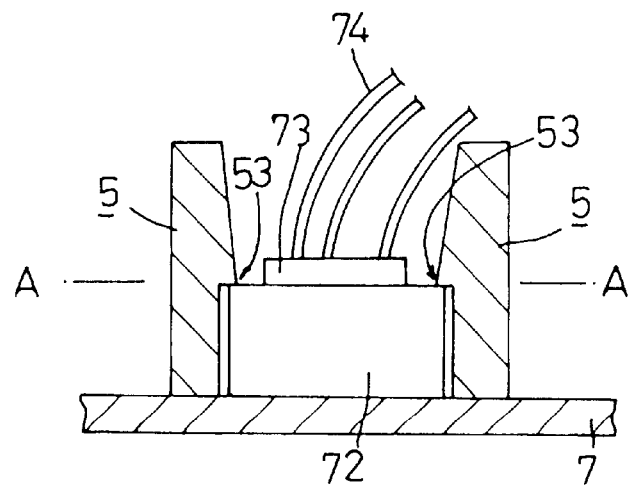

FIGS. 14(a) and 14(b) show a structure for engaging the female connector (72) on the circuit board (7) with the cell chamber peripheral wall (5). The rear case (12) includes a peripheral wall structure having a stepped portion (53) at the position of the parting line A—A and formed also around the female connector (72) on the circuit board (7). The stepped portion (53) of the chamber wall (5) is in engagement with opposite ends of upper face of the female connector (72) to hold the female connector (72) on the circuit board (7).

In assembling the telephone, the female connector (72) is secured to the circuit board (7) by soldering as shown in FIG. 14(a), the circuit board (7) is placed into the casing, the cell (2) is loaded into the cell chamber and the male connector (73) of the cell (2) is inserted into the female connector (72) on the circuit board (7), whereby the male connector (73) and the female connector (72) are joined to each other as shown in FIG. 14(b) for the supply of power to the board (7).

For example, when the male connector (73) is to be removed from the female connector (72) for the replacement of the cell (2), the force acting on the male connector (73) is therefore received by the stepped portion (53) of the chamber wall (5) and will not act to remove the female connector (72) from the circuit board (7).

The device of the present invention is not limited to the foregoing embodiments in construction but can be modified variously without departing from the spirit of the invention set forth in the appended claims. For example, the traylike sheet (3) can be replaced by the flat sheet (33) in the casing structure shown in FIGS. 8 to 11.

What is claimed is:

1. A portable wireless communications device including a casing (1) having a circuit board (7) accommodated therein for wireless communication and a cell chamber formed therein for accommodating a cell (2) serving as a power source for the circuit board (7), wherein the casing (1) is formed with a peripheral wall (5) defining the cell chamber, the peripheral wall (5) having an opening at each of an inlet side of the cell chamber and a bottom side thereof, the opening at the inlet side of the cell chamber being provided with a lid (13) removably attached to the casing (1) for closing the opening, the opening at the bottom side of the cell chamber being fixedly provided with a sheet separate from said peripheral wall for closing the opening.

2. A portable wireless communications device according to claim 1 wherein the sheet is in the form of a flat plate, the sheet (33) having a contour extending outwardly of the opening of the peripheral wall (5) at the cell chamber bottom side, the outward extension being in intimate contact with an end face of the peripheral wall (5).

3. A portable wireless communications device according to claim 1 wherein the sheet is in the form of a tray, the sheet (3) having a bottom (31) closing the opening of the peripheral wall (5) at the cell chamber bottom side, and a side wall (32) extending from an outer periphery of the bottom wall (31) and in intimate contact with the peripheral wall (5).

4. A portable wireless communications device according to any one of claims 1 to 3 wherein the sheet is made of a synthetic resin or metal.

5. A portable wireless communications device according to claim 2 or 3 wherein the sheet has a rear surface in contact with a surface of the circuit board (7).

6. A portable wireless communications device according to claim 2 or 3 wherein the casing (1) is molded from a resin with use of a pair of molds, and the peripheral wall (5) is molded from the resin with a parting line of the pair of molds positioned at an intermediate portion of thickness of the casing.

7. A portable wireless communications device according to claim 6 wherein the peripheral wall (5) comprises a first peripheral wall portion (51) at the cell chamber inlet side and a second peripheral wall portion (52) at the cell chamber bottom side, with the parting line serving as a boundary between the wall portions (51), (52), the peripheral wall portions (51), (52) defining respective spaces expanding in a direction away from the parting line, the first peripheral wall portion (51) projecting at the position of the parting line toward a center of the cell chamber beyond the second peripheral wall portion (52) to form a stepped portion (53) between the peripheral wall portions (51), (52).

8. A portable wireless communications device according to claim 7 wherein an outer end of the side wall (32) of the sheet (3) is in engagement with the stepped portion (53) of the peripheral wall (5).

9. A portable wireless communications device according to claim 7 wherein the side wall (32) of the sheet (3) is affixed to a surface of the second peripheral wall portion (52) of the peripheral wall (5).

10. A portable wireless communications device according to claim 7 wherein the cell (2) is formed on a side face thereof with a projection (21) engageable with the stepped portion (54) of the peripheral wall (5) when the cell (2) is accommodated in the cell chamber, and the stepped portion (54) prevents the cell (2) from slipping out of the cell chamber.

11. A portable wireless communications device according to claim 7 wherein a male connector (73) is connected to the cell (2) by a cord (74), and a female connector (72) for the male connector (73) to be inserted in is mounted on the circuit board (7), the stepped portion (53) of the peripheral wall (5) being in engagement with an upper end of the female connector (72) on the circuit board (7) to hold the female connector (72) on the circuit board (7).

12. A portable wireless communications device including a flat casing (1) having a circuit board (7) accommodated therein for wireless communication and a cell chamber formed therein for accommodating a cell (2) serving as a power source for the circuit board (7), wherein the casing (1) is molded from a resin with use of a pair of molds and formed with a peripheral wall (5) defining the cell chamber, the peripheral wall (5) being molded from the resin with a parting line of the pair of molds positioned at an intermediate portion of thickness of the casing, the peripheral wall (5) having an opening at each of an inlet side of the cell chamber being removably provided with a lid (13) for closing the opening, and wherein the opening of the peripheral wall (5) at the bottom of the cell chamber is fixedly provided with a sheet separate from said peripheral wall (5) for closing the opening.

13. A portable wireless communications device according to claim 12, wherein the sheet is in the form of a flat plate, the sheet (33) having a contour extending outwardly of the opening of the peripheral wall (5) at the cell chamber bottom side, the outward extension being in intimate contact with an end face of the peripheral wall (5).

14. A portable wireless communications device according to claim 12, wherein the sheet is in the form of a tray, the sheet (3) having a bottom (31) closing the opening of the peripheral wall (5) at the cell chamber bottom side, and a side wall (32) extending from an outer periphery of the bottom wall (31) and in intimate contact with the peripheral wall (5).

15. A portable wireless communications device according to claim 12 wherein the peripheral wall (5) comprises a first peripheral wall portion (51) at the cell chamber inlet side and a second peripheral wall portion (52) at the cell chamber bottom side, with the parting line serving as a boundary between the wall portions (51), (52), the peripheral wall portions (51), (52) defining respective spaces expanding in a direction away from the parting line, the first peripheral wall portion (51) projecting at the position of the parting line toward a center of the cell chamber beyond the second peripheral wall portion (52) to form a stepped portion (53) between the peripheral wall portions (51), (52).

16. A portable wireless communications device according to claim 15 wherein an outer end of the side wall (32) of the sheet (3) is in engagement with the stepped portion (53) of the peripheral wall (5).

* * * * *